United States Patent Office 3,387,582
Patented June 11, 1968

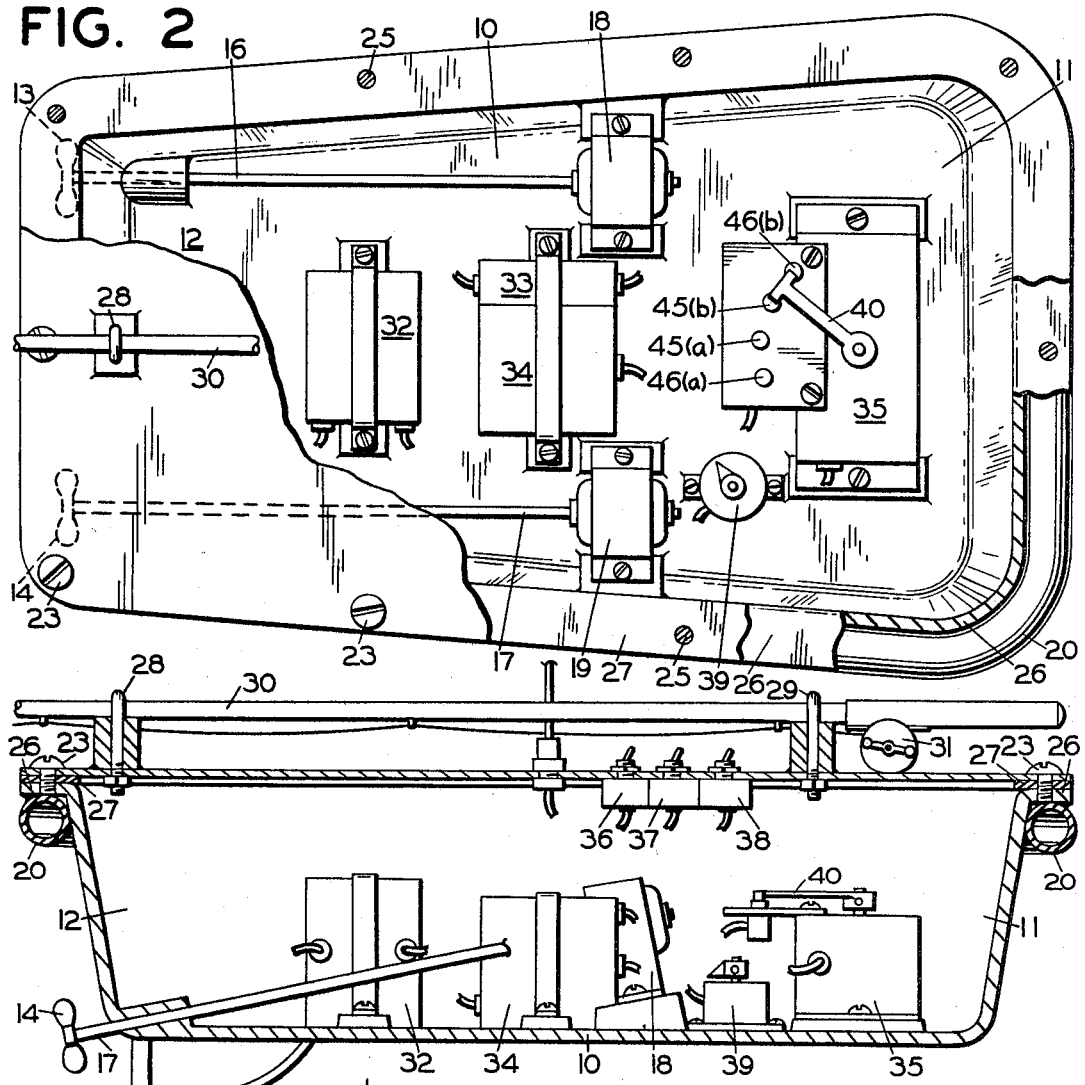

3,387,582
RADIO CONTROLLED FISHING BOAT
William R. Reeves, 865 E. High St., Apt. 404,
Lexington, Ky. 40502
Filed May 6, 1966, Ser. No. 548,331
4 Claims. (Cl. 115—.5)

This invention relates to a radio controlled boat useful in fishing.

As is well known to those who engage in sport fishing, it is often difficult to place a fishing line carrying live or artificial bait into an area of a body of water where it is known or suspected that fish reside. This may be due to any number of natural hazards such as low tree limbs, lily pads, rocks, and so forth. Fishermen employ waders or boats to overcome these disabilities where feasible. However, not all fishermen have boats at their disposal, and are confined to fishing from on or near the shore of bodies of water, with the attendant disabilities enumerated above. Furthermore, even with the use of a boat, it is not always possible to place fishing tackle in a desirable location.

It is an object of this invention therefore to provide a means whereby fishermen may precisely place their fishing tackle into a particular area in a body of water.

It is a further object of this invention to provide a radio controlled boat powered by suitable batteries for carrying fishing tackle to a desired location in a body of water, the boat being controllable by the fishermen at a distance.

These and other objects of this invention will become apparent in the following description and by reference to the drawings, in which:

FIGURE 1 is a sectional side view of the radio controlled boat;

FIGURE 2 is a top view of the radio controlled boat with the deck removed;

FIGURE 3 is a schematic representation of the wiring diagram of the radio controlled boat.

It has been found that by employing a radio controlled boat of a particular design, to be hereinafter described, fishing tackle may be carried thereby to any location on a body of water desired.

When casting by conventional fishing methods, it is difficult to move a lure great distances continuously near the shore without distracting the fish. The radio controlled boat of this invention provides a means for keeping a lure continuously near the shore, where chances of a strike are frequently greater. By employing the radio controlled boat described herein, repeated casting of the lure into a desirable area is eliminated, thus saving both time and energy. Furthermore, it has been noticed that whereas fish often seem to ignore a lure cast into their vicinity by conventional means, they seem to be attracted by the vibrations or motion of the radio controlled boat passing overhead, and have a greater propensity for being attracted to the lure carried thereby.

The boat of this invention has a hull that is designed to draw a shallow draft when placed into water. This is more important than having a hull designed for speed because the boat must be able to operate in shallow water and over the many obstacles that may reach up to near the surface of the water, such as is frequently found near the shores of bodies of water.

As well as being designed for drawing a shallow draft, the hull is also designed for maximum stability. This is necessary because of the turning and swamping forces that will be applied to the boat by fish that are caught by the fishing tackle carried by the boat.

These shallow draft and stability features are desirably achieved by configuring the hull so that it is generally rectangular in shape in a plane through the water line, with the bow being slightly wider of beam than the stern.

In order to prevent damage to the controls and engines by water, these elements are carried in the hull, which is then covered by a deck.

Because the boat is designed to operate at very low speeds, rudders have been found to be largely ineffective as guidance means, and it has been found that in order to achieve proper guidance, at least two propellers, one each on the port and starboard sides, must be employed. These propellers are separately operable whereby the boat may be turned in various directions. The propellers are each operated by their own inboard electric motor, which are powered by electric battery means. Each engine is separately operable in response to a radio signal from a transmitter carried by the fisherman on shore or in a boat. When both port and starboard propellers are operating the boat moves forward in a generally straight line. When only the port engine is operating, the boat is turned to the starboard, and when only the starboard engine is operating, the boat moves to the port side.

Referring now to FIGURES 1 and 2, reference numeral 10 represents the hull of the radio controlled fishing boat. As can be seen from the drawings, hull 10 is generally rectangular in shape with bow section 11 being slightly wider of beam than stern section 12. This shape provides greater stability than a more streamline shape, and also permits the boat to draw a shallow draft, both of these being desideratums for reasons given previously.

Propellers 13 and 14 are located outside stern transom 15 on the port and starboard sides, respectively, thereof. These propellers are connected by drive shafts 16 and 17 to motors 18 and 19. Shafts 16 and 17 extend through stern transom 15, and may have any suitable sealing means such as a stuffing box (not illustrated) associated therewith to prevent leakage of water into the hull.

Located around the periphery of hull 10 is an inflated flexible tube member 20. Flexible tube member 20 aids in buoying the hull thereby promoting a shallow draft and also acts as a fender to protect the hull and the mechanisms located therein from injury in the event the boat runs into a foreign object.

Located on the bottom of hull 10 at the stern section 12 thereof are two diverters 21 located beneath and in line with drive shafts 16 and 17. These diverters are highly desirable to prevent fouling of the propellers by marine growth.

Covering the hull 10 is a deck 22 which is fastened to the hull by any suitable means, preferably so that it is easily removable for access to the operating mechanisms located therein such as by use of bolts 23 inserted through a plurality of holes 25 in flange 26 of hull 10, and wing nuts, not shown. A gasket 27 may be inserted between the deck 22 and hull flange 26 to effect a good watertight seal.

Attached to the top of deck 22 are any suitable clamping means 28 and 29 (such as U-bolts) for holding a fishing rod 30 and reel 31 securely thereto. The rod 30 may be facing either aft or forward; however, the former is preferred as it lessens the possibility of the line tangling with the propellers.

Located within hull 10 are batteries 32 and 33, radio receiver 34, servo mechanism 35 and rheostat 39, connected by suitable wiring as illustrated and explained hereinbelow. Switches 36, 37 and 38 are desirably located outside the hull 10 for ease of access thereto when deck 22 is fastened in place.

Electric motors 18 and 19 are conventional 6 volt D.C. motors, such as Model 5 Aristo-Craft. An alternative is to use Dolphin I or Dolphin II motor, drive and propeller systems.

Radio receiver 34 is a conventional 1 channel, 9 volt receiver such as Model 33 Astro, and is powered by battery 33. Switch 37 connects receiver 34 into the circuit of battery 33.

Servo mechanism 35 is a self-reversing type with armature contact arm 40 responsive to signals generated through terminals 41 or 42 of receiver 34 via servo input contacts 43 or 44. Depending upon what signal is received, armature contact arm 40 may respond by moving to servo output contact 45(a) or contact 46(a). During periods of no signal, armature contact arm 40 automatically reverses into contact with both outputs 45(b) and 46(b).

Battery 32 (6 volts) has its negative terminal connected to motors 18 and 19. The positive terminal of battery 32 is connected to switch 36 which is closed during operation. Switch 38 permits rheostat 39 to be bypassed, if desired.

In operation, switches 36 and 37 are closed, and switch 38 is either open or closed, depending upon whether rheostat 39 is to be employed. When switch 36 is closed, the receiver 34 is connected into the circuit of battery 33. Armature contact arm 40 of servo mechanism 35 is in the position shown, in contact with servo output contacts 45(b) and 46(b), and both motors 18 and 19 are activated.

If it is desired to operate only motor 18, a signal is sent to receiver 34 by means of a conventional transmitter operating on citizens band. A suitable transmitter is Model 33 Astro. This signal is received by the receiver 34, and in response thereto, a current is generated through terminal 41 to actuate servo mechanism 35 and cause it to move armature contact arm 40 to contact 45(a). Motor 18 is already connected to the negative terminal of battery 32, as shown. Current from the positive terminal of battery 32 now moves through switch 36 (which is closed) through either rheostat 39 or through switch 38, depending upon which circuit is operational, to arm 40, and from there through contact 45(a) to motor 18. The circuit to motor 18 is thus completed, and it is actuated.

Similarly, if it is desired to operate only motor 19, a suitable signal is sent to receiver 34 to cause it to generate a signal through terminal 42, which actuates servo mechanism 35 to move armature arm 40 to contact 46(a) to complete the circuit from battery 32 to motor 19.

If it is desired to operate both motors 18 and 19, no transmitter signal is sent to receiver 34. Armature arm 40 then moves automatically into contact with both contacts 45(b) and 46(b) by virtue of its self-reversing action, thus completing a circuit from battery 32 to both motors 18 and 19.

From the foregoing description of the radio controlled fishing boat of this invention, it is seen that with a fishing rod and reel attached to the boat, they may be carried to any area of a body of water within reach of a radio signal.

The boat is easily maneuvered by actuating one or both of the motors. The boat then is kept in continuous motion back and forth across a promising fishing area for trolling. When a fish is caught (hopefully), the boat may be maneuvered to play the fish back toward the fisherman, and eventually to bring the rod and reel back to the fisherman who then executes the coup de grace.

While the invention has been described in detail with respect to the specific embodiment illustrated, it will be readily apparent to those working in the art that various modifications may be made thereto, and these are intended to be included within the scope of the following claims.

I claim:

1. A radio controlled boat for carrying fishing tackle comprising:
   a hull drawing a shallow draft, said hull being generally rectangular in shape;
   at least one propeller located on each the port and starboard sides of the stern end of the hull for driving the hull through the water;
   independently driven motor means located inside said hull connected to said propellers by independent drive shafts for driving said propellers;
   a radio receiver located within the hull and capable of generating an output signal in response to receipt of a radio signal;
   a servo mechanism for receiving said output signal from said receiver, and in response thereto actuating one or all of said independently driven motor means into operation;
   means located on said boat for carrying fishing tackle, and a rod and reel located on said boat and held thereto by said means for carrying fishing tackle.

2. The radio controlled boat of claim 1 including an inflatable tube member located around the periphery of said hull.

3. The radio controlled boat of claim 1 wherein the bow section of said hull is slightly wider of beam than the stern section.

4. The radio controlled boat of claim 1 wherein there is one propeller located on each the port and starboard sides of the stern end of said hull.

References Cited

UNITED STATES PATENTS

| | | | |
|---|---|---|---|
| 2,832,426 | 4/1958 | Seargeant | 180—2 |
| 2,848,725 | 8/1958 | Sloulin | 114—219 X |
| 3,026,545 | 3/1962 | Brainard | 244—77 |
| 3,294,054 | 12/1966 | Norton | 115—37 |

ANDREW H. FARRELL, *Primary Examiner.*